Jan. 18, 1938. M. BECHIK 2,105,580
HANDLE
Filed June 7, 1935
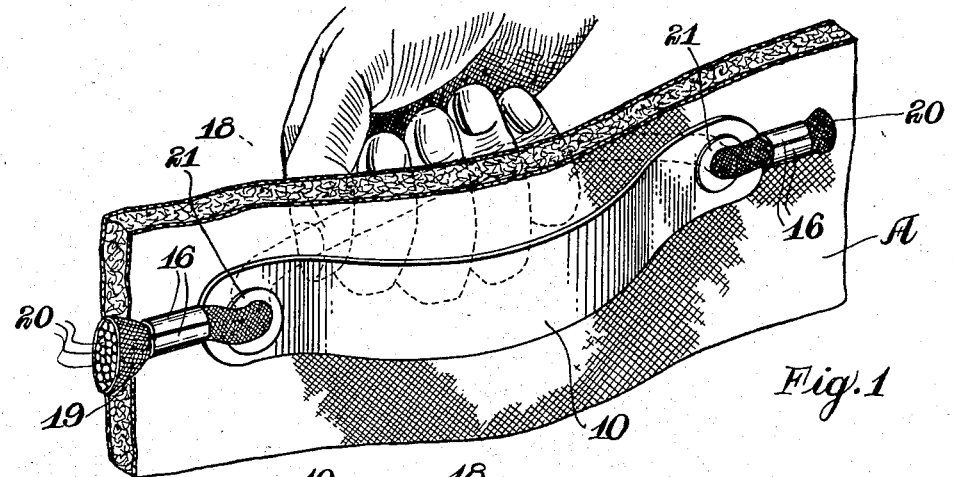
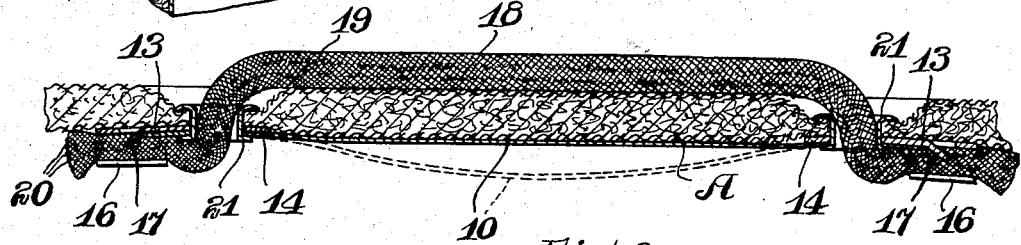
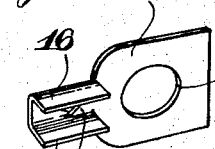
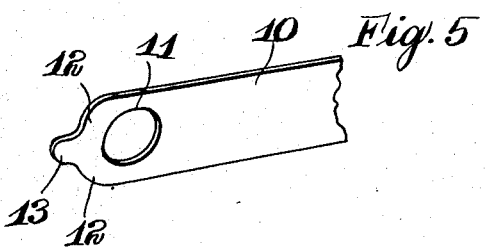
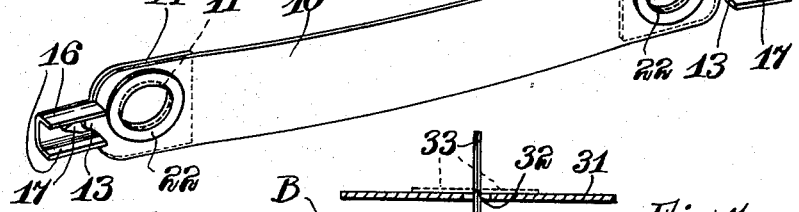
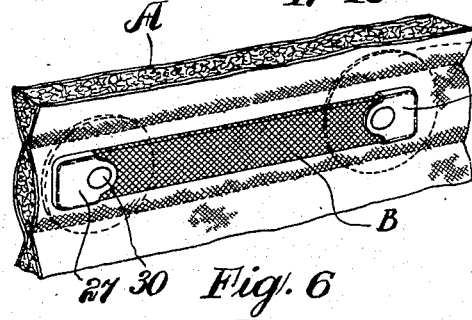
Inventor
Michael Bechik
By Howard Fincher
Attorney Patented Jan. 18, 1938

2,105,580

UNITED STATES PATENT OFFICE 2,105,580

HANDLE

Michael Bechik, St. Paul, Minn.

Application June 7, 1935, Serial No. 25,425

5 Claims. (Cl. 5—345)

This invention relates to a handle which is designed to provide a soft free engagement of the handle cord or strap by the hand and having a spring body nature which causes the side wall to which the handle is attached to straighten out flat with the handle cord lying close to the body at all times when the cord is not in use.

A primary feature resides in providing a handle which can be easily engaged by the hand yet wherein the handle cord or strap will not hang down or be unsightly, and wherein the wall to which the handle is secured will be stretched out flat when the handle cord is not engaged.

A further feature resides in providing a reinforcing inner back bar formed of spring material so that when the hand engages the cord on the outside of the wall, the spring back bar will flex, permitting the hand to freely engage the cord, thereby providing a spring reinforcing means by the back bar which normally extends straight and flat against the inner wall to which the handle is attached. Thus the flexible inner back bar tends to normally keep the wall stretched straight and flat, and automatically stretching and flattening the handle cord against the outer wall, thereby providing a construction of handle which has a neat and tidy appearance. My handle may include a flexible back bar portion which is adapted to be attached to plate washer members by eyelet means extending through the back bar and washer and through the wall to which the back bar is attached.

A further feature resides in providing washer-like end reinforcing members which form plate load-bearing means at the ends of the flexible bar.

Further, my invention includes plate load-bearing washer means at the ends of the flexible bar with cord gripping means which includes a piercing spur adapted to sink and become embedded into the locked end of the cord when the clamping members of the plate are pinched around the end of the cord to positively attach the same.

The ends of the flexible inner bar are formed with a lug which extends between the flanges which are formed on the load-bearing washer plates to hold the washer plate and the flexible bar connected together in line when the same are assembled and attached to a wall which is adapted to support my handle. These lugs on the ends of the flexible member prevent the rotation of the load-bearing washer plates in respect to the flexible member.

A further advantage of my handle resides in providing a flexible structure which makes it easy to engage the handle cord and yet wherein the load carried by the ends of the handle is dissipated by the rigid load-bearing plates over a sufficient area on the inside of the wall to which the handle is attached to prevent the same from tearing the wall.

In the drawing:

Figure 1 is a perspective view of my handle structure looking at the same from the inside of the wall to which it is attached.

Figure 2 is a longitudinal section through the handle, showing the manner in which the flexible back bar lies normally flat against the inner wall and holds the handle cord stretched flat against the outer wall.

Figure 3 is a perspective of the flexible back bar, showing the relative position of the rigid end load-bearing washer-like plates which have gripping flanges for the ends of the handle cord.

Figure 4 is a perspective view of one of the washer load-bearing plates.

Figure 5 is a detail of one end of the flexible back bar.

Figure 6 illustrates a perspective of a portion of a side wall of a mattress or cushion, showing another form of my handle as it would appear in use when attached to the side wall.

Figure 7 is a detail of a portion of the handle structure of Figure 6, showing the parts in their relative position without the padded side wall and before the flexible ends of the split rivet are bent over the washer.

The drawing illustrates a wall A to which my handle is attached. This wall A may be of any character such as the boxing wall of a mattress or of a cushion, or it may be the wall of a vehicle door, or any flexible wall where my handle is desired to be used.

My handle includes a flexible back bar member 10 which may be made of steel or any other suitable spring, flexible material. The bar 10 is formed with holes 11 at the ends thereof and is formed with rounded portions 12 from which projects an aligning lug 13. The back bar 10 is of the same form at each end.

The handle assembly includes washer load-bearing plates 14 for each end which are formed with a hole 15 adapted to coincide with the hole 11 of the bar 10. The plates 14 are formed with gripping flanges 16 which project from the ends of the body of the plate 14 and between which projects a cord gripping spur 17.

The handle assembly includes a suitable handle cord 18 which may be round with an outer woven fabric covering 19 and inner strands of cord 20, or may be of a strap-like nature (not shown) or of any other suitable form.

My handle is adapted to be attached to the wall A as illustrated in Figures 1 and 2 by assembling the flexible back bar 10 to the rigid end washer load-bearing plates 14 by means of the eyelets 21 which extend through the wall 10 and clamp the bar 10, the end plates 14, and the wall A, firmly together. The flexible bar 10 is adapted to extend along the inner side of the wall A.

The handle cord 18 extends along the outside of the wall A in line with the inner flexible bar 10. The ends of the handle cord 18 are adapted to extend through the eyelets and as one end is firmly clamped between the flanges 16 with the spur embedded into the body of the end, the other end of the cord can be stretched taut, whereupon the flanges 16 are clamped about the same, thereby permitting the attaching of the cord 18 under a slight tension which is counteracted by the spring back bar 10. Thus I provide a handle assembly including the flexible back bar 10, the end plates 14, the eyelets 21 and the handle cord 18. When these parts are connected together in the manner described, the cord 18 is held under the tension of the spring back bar 10 and will not stretch under ordinary use at any time so as to hang free on the outside of the wall A. Thus the flexible spring bar keeps the cord 18 normally taut when the cord 18 is not engaged by the hand. However, the cord 18 is held by the spring back bar 10 in such a manner that a lady may place her hand about the same with ease and comfort so that a firm grip may be placed about the cord 18 to permit the ready engagement of the handle at any time. The rigid load-bearing end plates provide rigidity to the ends of the flexible back bar 10 as well as forming a plate of sufficient area to spread the load over the inner surface of the wall A to form a very strong and substantial handle.

The aligning lugs 13 on the ends of the bar 10 project between the flanges 16 to keep the plates 14 in longitudinal alignment with the bar 10.

It is obvious that my handle assembly may be connected together by assembling the flexible back bar 10 to the end plates 14 by a suitable eyelet 22 which has a sufficiently large opening through the same so that the eyelet 21 may act to hold this assembly to the wall A if it is desired.

The drawing illustrates the side wall A in Figure 6 with a spring handle portion B positioned along the outside of the wall A. The handle B is made up of an inner spring bar 25 which is covered with a cloth or textile or fabric covering 26.

The spring member 25 may be of a flat nature so as to lie normally flat and comparatively snug against the outer wall A of the side of the mattress or cushion. It is also apparent that the spring member 25 may be of any other suitable shape or nature wherein the same is adapted to extend straight and in close proximity to the outer wall of the side A when the handle B is not engaged.

The ends of the handle B may be protected and covered by plate members 27 which are formed to fit over the ends of the bar 25. The plates 27 have inwardly extending marginal edges 28, or they may be formed to cover the end of the bar 25 on both sides thereof, as well as the extreme end. These plates 27 are formed with an opening 29 through which the split rivet 30 extends to secure the handle B to the wall A of the mattress. Large bearing washers 31 which have an opening 32 for receiving the inner ends of the split rivet 30 are adapted to be positioned on the inside of the wall A and the inner free ends 33 of the split rivet 30 are bent over as illustrated in dotted lines in Figure 7 to clinch the same. The rivets 30 are of a sufficiently strong nature so that when the ends 33 are bent over into clinching position, the handle B is held securely to the outer wall A of the mattress or cushion. The bearing plates 31 provide a broad flat surface on the inner wall of the mattress so as to carry the load or strain exerted against the handle B when it is engaged.

In the structure of the handle shown in Figures 6 and 7, the spring bar 25 acts as the handle proper on the outside of the mattress wall and is covered with cloth which may be of the same color as the outside wall of the mattress; and the function of the spring handle B is the same as the spring bar 10 on the former described structures of my handle, in that the bar 25 stretches out flat when not in use to keep the wall of the mattress straightened out flat when the handle is not engaged, thereby giving a neat and tidy appearance to the mattress as a whole. This handle is of an inexpensive construction yet it has the advantage of providing a very substantial gripping means for the hand in engaging a mattress or the like. It is apparent that the bar 25 of the handle B is sufficiently long to provide the necessary opening for the width of the hand in engaging the same.

This simple structure as herein defined for a handle provides a very practical and desirable means of anchoring the ends of a handle cord to flexible mattress walls, or other flexible walls where a handle of this nature is desirable, in a strong and durable manner so that a considerable load may be carried by the handle. Further, my handle having the advantage of soft engagement, is more desirable than handles that have been used for this purpose heretofore. It is apparent that variations may be made, and I desire to have it understood that such modifications as may be apparent to anyone skilled in the art may be included in this invention without departing from the spirit of the same when interpreted within the scope of the following claims.

I claim:

1. A flexible handle including, a flexible resilient reinforcing bar means, means for attaching said bar to the inside of a flexible wall, and a flexible handle cord means extending along the outside of the wall and having its ends passed through the walls and secured to the ends of said flexible bar, the resiliency of said bar holding said flexible handle means normally taut.

2. A flexible handle for a mattress and the like comprising, relatively rigid and load-bearing end plate means, flexible and resilient means spacing said end plates apart, means for securing said end plates and flexible means to the inside of the flexible wall of the mattress, and a flexible handle member extending along the outside of the wall of the mattress and having its ends extending through the wall and means for anchoring the ends of said handle member to said load-bearing plate means to hold said handle member normally taut by the resiliency of the flexible and resilient means.

3. A handle assembly for a flexible wall including, a flexible resilient bar member overlying the inside of the wall, openings formed in the ends of said member, aligning lugs projecting from the ends of said member, load-bearing end plates, a hole in each of said plate members, clamping flanges formed on said plates between which said aligning lugs of said flexible member are adapted to engage to align said end plates with said flexible member, means extending through said holes for securing said plates and said flexible member together, spurs projecting between said clamping lugs on said plates, and handle cord means extending along the outside of the wall and having its ends passed through the wall and secured by said clamping flanges and said spurs.

4. A flexible handle including, a flexible resilient reinforcing bar member, means for attaching said bar to the inside of a flexible wall, and a flexible handle means lying flat along the outside of the wall and anchored at its ends to the means for securing said flexible bar, the resiliency of said flexible bar normally stretching said flexible handle means taut.

5. The combination of a soft flexible mattress or cushion wall, a flexible reinforcing bar extending along the inside of said wall and fixed thereto and a flexible handle on the outside of said wall and extending parallel to said reinforcing bar with its ends anchored to the ends of said bar, to direct the load on the handle to the ends of said bar, said bar flexing to permit the wall to bend to receive the hand while engaging said handle and having a spring action to straighten said handle flat against the outside of the wall when not engaged.

MICHAEL BECHIK.